Feb. 27, 1951     M. J. BOOR ET AL     2,543,147
WHEEL MOUNT AND STEERING ASSEMBLY
Filed Nov. 23, 1948     2 Sheets-Sheet 1
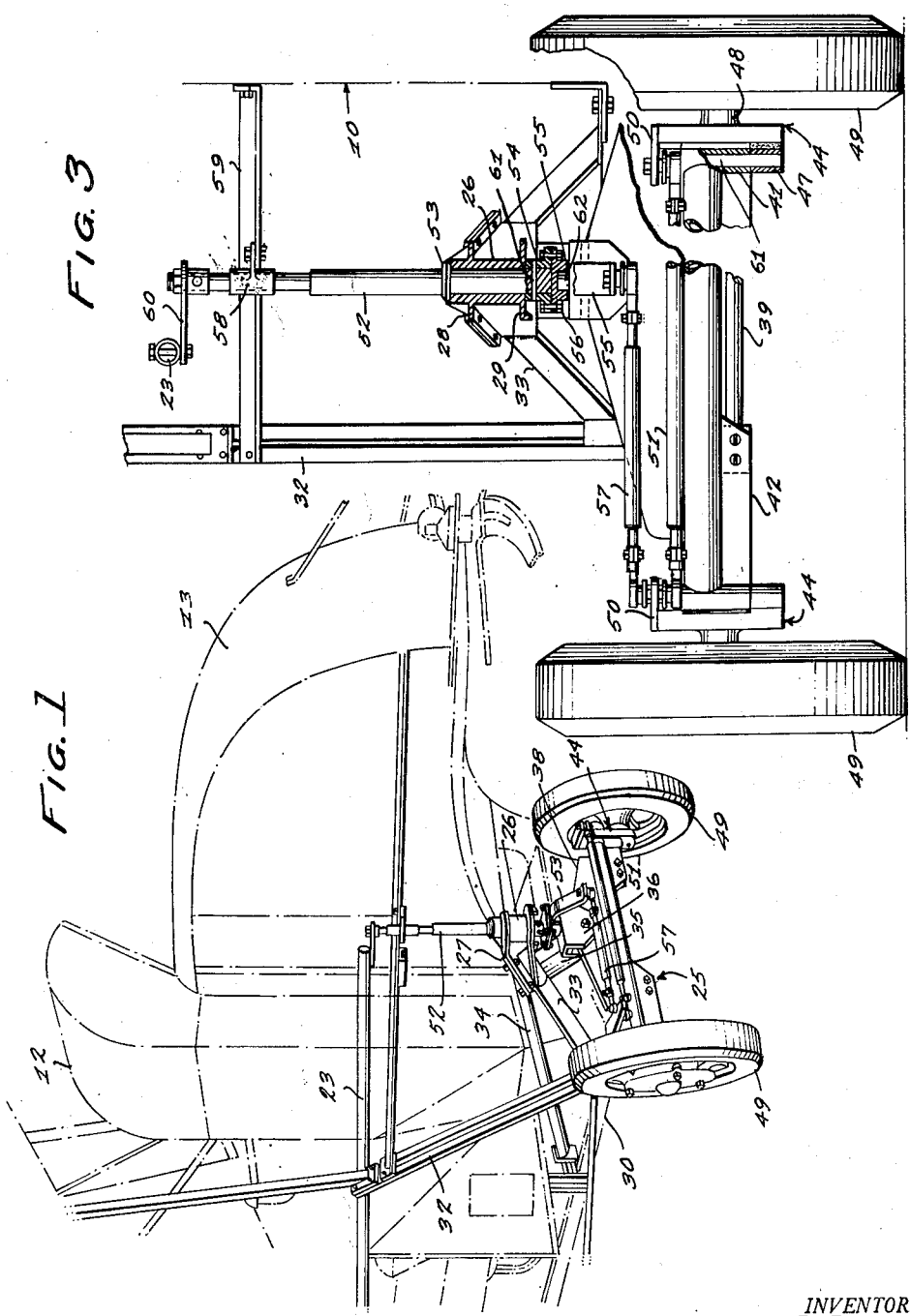
INVENTORS
Mathias J. Boor
John L. Boor
BY
McMorrow, Berman + Davidson
ATTORNEYS Feb. 27, 1951  M. J. BOOR ET AL  2,543,147
WHEEL MOUNT AND STEERING ASSEMBLY
Filed Nov. 23, 1948  2 Sheets-Sheet 2
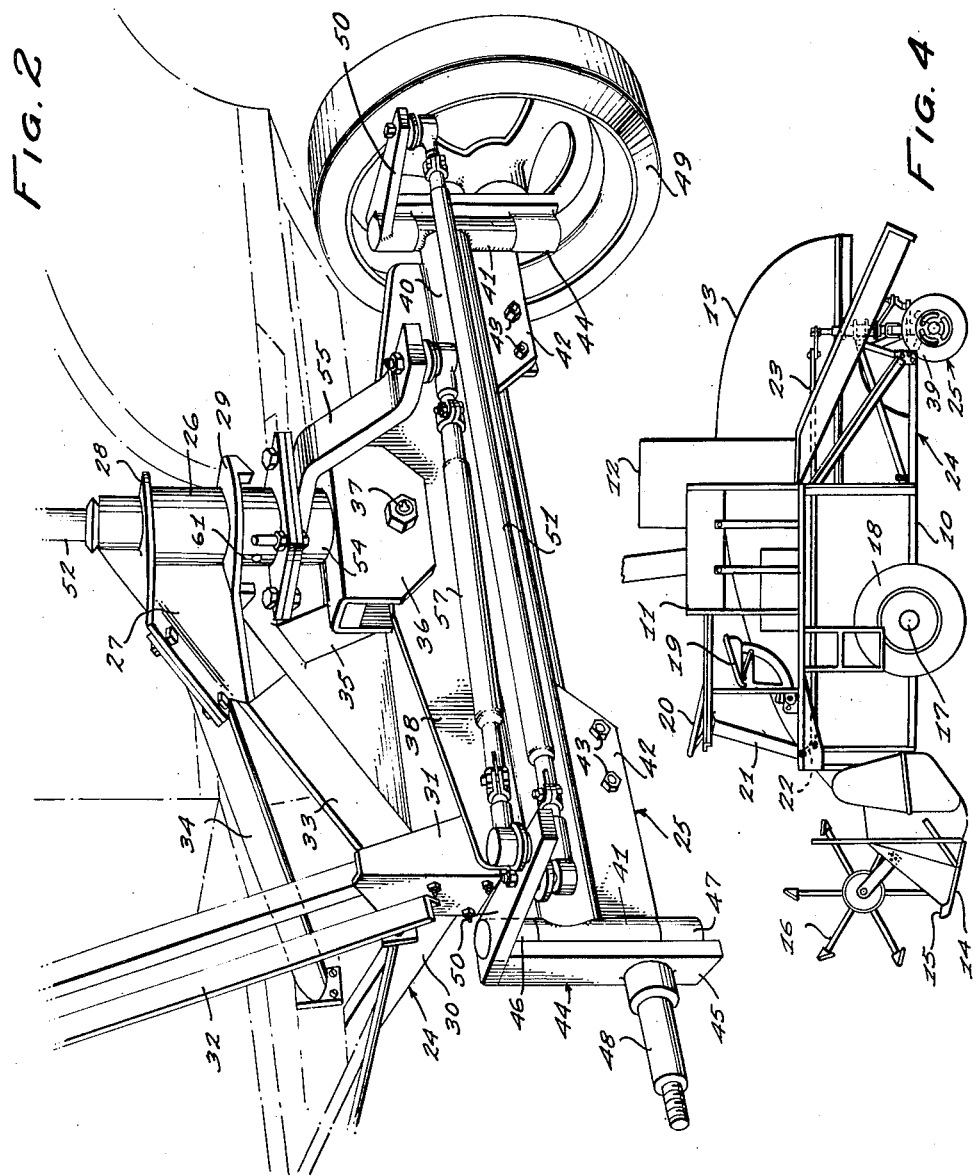
INVENTORS
Mathias J. Boor
John L. Boor
BY
McMorrow, Berman + Davidson
ATTORNEYS Patented Feb. 27, 1951

2,543,147

UNITED STATES PATENT OFFICE 2,543,147

WHEEL MOUNT AND STEERING ASSEMBLY

Mathias J. Boor and John L. Boor,
Redwing, Kans.

Application November 23, 1948, Serial No. 61,586

1 Claim. (Cl. 280—95)

This invention relates to harvester-thresher combines, and more particularly to an improved, wheeled support for such a combine.

It is among the objects of the invention to provide a steerable, wheeled support for the rear portion of a combined grain harvesting and threshing machine or combine, which support is of extremely strong and durable construction, is attachable to the combine without requiring any material modification of the combine structure, is transversely rockable relative to the combine to avoid imposing any heavy strains on the combine structure as the combine passes over rough or uneven ground, is easily steerable by the combine operator to steer or assist in steering the combine, is applicable with equal facility to a self-propelled or tractor drawn combine, and provides at the rear of the combine, a pair of spaced-apart wheels independently pivoted to a transverse axle structure to render the steering of the combine easier, more positive and faster than with conventional rear end supports.

Other objects and advantages will become apparent from a consideration of the following description, and the appended claim in conjunction with the accompanying drawings wherein:

Figure 1 is a perspective view of the rear portion of a conventional combine, showing the application thereto of a wheeled support illustrative of the invention;

Figure 2 is a perspective view on an enlarged scale of the wheeled support;

Figure 3 is a rear elevation of the wheeled support, portions being broken away and shown in cross section to better illustrate the construction thereof; and Figure 4 is a side elevation of a conventional combine showing the application thereto of a wheeled support illustrative of the invention.

With continued reference to the drawings, and particularly to Figure 1, the combine therein illustrated has a body, generally indicated at 10, a grain box 11 supported above the body, a grain elevator 12, extending from the body to a location above the grain box, a straw chute 13 extending rearwardly from the body to deposit the straw back onto the ground, and a table or platform 14 pivotally mounted on the front end of the body. The platform 14 carries a cutting or cycle bar 15 at its forward edge, and a reel 16 is pivotally mounted on the platform to force the grain backwardly over the cutting bar onto the platform where it is picked up by suitable conveyors and carried to the conventional threshing mechanism contained in the body 10.

The body 10 is supported on a main axle 17 which extends transversely below the body somewhat nearer the forward end than the rearward end of the body, and ground wheels 18 journalled on the opposite ends of the main axle.

The combine illustrated is a self-propelled type and has a driver's seat 19 supported upon the body, and a steering wheel 20 disposed in front of the seat 19 and connected to the upper end of a steering shaft which extends downwardly through the column 21 and has on its lower end an outwardly extending arm 22. A steering rod 23 is pivotally connected at its forward end to the outer end of arm 22 and extends rearwardly of the combine in a substantially horizontal position to an operative connection with the steering mechanism of the rear end support of the combine.

While a self-propelled combine has been shown in the drawings for the purpose of illustrating the invention, it is to be understood that the improved rear end support may be applied with equal facility to either a self-propelled or a tractor drawn combine and that the combine itself is conventional in construction and constitutes no part of the present invention except in the combination thereof, with the improved wheeled support.

The wheeled support comprises a frame structure, generally indicated at 24, firmly secured to the rear portion of the combine body and a wheeled truck 25 secured to the frame structure 24 for supporting the rear end of the combine through the frame structure.

Referring now to Figures 1, 2, and 3, the frame 24 includes a cylindrical sleeve 26 having an angular bracket 27 projecting from the forward side thereof, and a pair of outwardly-projecting, substantially annular flanges 28 and 29 disposed one at the upper and one at the lower end of the sleeve.

A bar 30 is secured at its forward end to the rear portion of the combine body 10 near one side of the latter and a bracket 31 is secured on the rear end of this bar and extends upwardly therefrom. A diagonal brace 32 extends from the bracket 31 upwardly and forwardly to the rear portion of the combine body and a strut 33 extends upwardly and inwardly from the bracket 31 to the sleeve-carried bracket 27. The strut 33 is a hollow body of rectangular cross-sectional shape and is substantially triangular in planform. The apex of this strut is connected to the bracket 27, one corner is connected to the bracket 31 and the opposite corner is connected to a bracket, not illustrated, secured to a corner of the body frame of the combine at the rear end of the body. A tubular brace 34 also extends forwardly from the bracket 27, downwardly and forwardly to the rear end of the body frame at a location disposed inwardly of the forward end of the bar 30.

A hollow block 35 extends downwardly and rearwardly from the strut 33, substantially in line with the sleeve 26 and an inverted U-shaped bracket 36 has its forward side rigidly secured to the block 35 so that the bracket is rigidly secured to the strut below the lower end of sleeve 26. This bracket has aligned apertures in the sides thereof to receive a pivot bolt 37 and a transverse, flat axle bar 38 is received, substantially at its midlength location, in the bracket 36 and is provided with an aperture receiving the pivot bolt 37 so that the axle bar is pivotally secured to the bracket for rocking movements transversely of the combine body. A V-brace, or "wishbone" 39 has its legs secured at their spaced-apart ends to the axle bar 38 adjacent the ends of the latter and has the common, forward ends of its legs secured by a suitable ball and socket joint, not illustrated, to the lower edge of strut 33 near the center of the latter to maintain the axle bar 38 substantially at right angles to the longitudinal center line of the combine body.

A tubular axle 40 is welded to the lower edge of the bar 38 and cylindrical, spindle pin receptacles, or bearings 41, are secured one on each end of the axle 40.

Each cylindrical receptacle 41 is provided with a longitudinally-extending bore to receive the corresponding spindle or kingpin 61 and the connections between these receptacles and the axle 40 are reinforced by respective brace plates 42 extending inwardly from the receptacle along the bottom side of the axle and securely welded to the receptacles and the axle. In Figure 2, the bolts, by means of which the rear end of the wishbone 39 is connected to the axle structure, are indicated at 43.

A pair of wheel spindles, generally indicated at 44, are pivotally connected, one spindle to each end of the axle 40. Each of these spindles comprises a rectangular plate 45, a pair of spaced-apart cylindrical lugs 46 and 47, disposed at the top and the bottom of the plate 45 at one side of the latter, and a wheel arbor 48 projects outwardly from the opposite side of the plate. The lugs 46 and 47 are spaced apart to receive the corresponding receptacles 41 between them, and a suitable spindle pin or kingpin 61 extends through the bores of each pair of upper and lower lugs 46 and 47 and through the associated receptacles or bearings 41 to pivotally connect the wheel spindle to the corresponding end of the axle structure.

A rubber tired wheel 49 is journalled on each arbor 48 and retained thereon by suitable conventional means. A respective steering arm 50 extends rearwardly from the upper end of each spindle 44 and an adjustable tie rod 51 pivotally interconnects the outer or distal ends of these arms.

A steering shaft 52 is journalled in the cylindrical sleeve 26 and extends therethrough. An annular enlargement 53 on this steering shaft bears on the upper end of the sleeve to position the shaft longitudinally of the sleeve and a flanged collar 54 is secured on the lower end of the shaft below the sleeve. A steering drop arm 55, having an outwardly extending flange, is secured to the collar 54 by suitable bolts 56 extending through aligned apertures in the arm and collar flanges and this arm 55 projects outwardly to the rear of the steering shaft. An adjustable drag link 57 pivotally connects the outer, rear end of the steering drop arm 55 to one of the steering arms 50 near the outer or distal end of the latter, so that when the steering shaft 52 is rotated the wheel spindles 44 are simultaneously rotated about the axes of the respective king or spindle pins to impart steering movements to the wheels 49.

The steering shaft 52 extends upwardly above the cylindrical sleeve 26 and is journalled near its upper end in a bearing 58 secured to a transverse frame member 59, one end of which is connected to a side wall of the combine body 10 and the other end of which is connected to the diagonal brace 32 near the upper end of the latter. An arm 60 is secured on the upper end of the steering shaft 52 and the outer end of this arm is pivotally connected to the rear end of the steering rod 23, the forward end of which is pivotally connected to the steering shaft arm 22 to transmit rotational movements of the steering wheel to the steering shaft 52.

By this means the frame is rigidly secured to the body of the combine, the axle structure is rockably secured to the frame and positively held at right angles to the longitudinal center line of the frame and the two spaced-apart wheels are independently pivoted to the rockable axle structure and are steered from the steering wheel positioned at the front end of the combine.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a grain harvester-thresher combine having a body, a main axle extending transversely below said body near the front end of the latter, and combine supporting wheels journalled on the ends of said main axle, means supporting said body rearwardly of said main axle comprising a frame secured to said body and a wheeled truck pivotally connected to said frame, said frame including a substantially vertically disposed sleeve, an inverted, U-shaped bracket secured to said sleeve and disposed below the lower end of the latter, said bracket having aligned apertures therein, and said truck comprising a flat bar received at its mid-length location in said bracket to extend transversely of said combine body and having an aperture therethrough, a pivot pin extending through the apertures in said bracket and said bar, a spindle pin bearing at each end of said bar, a respective wheel spindle receiving each bearing, a respective spindle pin pivotally connecting each spindle to said bar, a respective wheel journalled on each spindle, a respective arm extending rearwardly from each spindle, a tie bar inter-connecting the distal ends of said arms, a steering shaft journalled in said sleeve, an arm extending outwardly from the upper end and an arm extending outwardly from the lower end of said shaft, a drag link pivotally connecting the outer end of the lower shaft arm to the outer end of one of said spindle arms, and a steering rod pivotally connected to the outer end of the upper shaft arm and extending forwardly from the latter.

MATHIAS J. BOOR.
JOHN L. BOOR.

REFERENCES CITED

The following references are of record in the file of this patent:

UNITED STATES PATENTS

| Number | Name | Date |
|---|---|---|
| 1,164,925 | Clapp | Dec. 21, 1915 |
| 1,826,238 | Buse | Oct. 6, 1931 |
| 1,851,866 | Quinan | Mar. 29, 1932 |
| 2,175,965 | Madden | Oct. 10, 1939 |
| 2,178,505 | Warneke | Oct. 31, 1939 |
| 2,264,924 | Wolrab | Dec. 2, 1941 |